Aug. 26, 1958   D. A. ROGERS, JR., ET AL   2,849,527
POLYMERIC COMPOSITION CONTAINING SILICONE MODIFIED
UNSATURATED POLYESTER AND VINYLIDENE MONOMER AND
ELECTRICAL CONDUCTOR COATED THEREWITH
Filed May 20, 1955
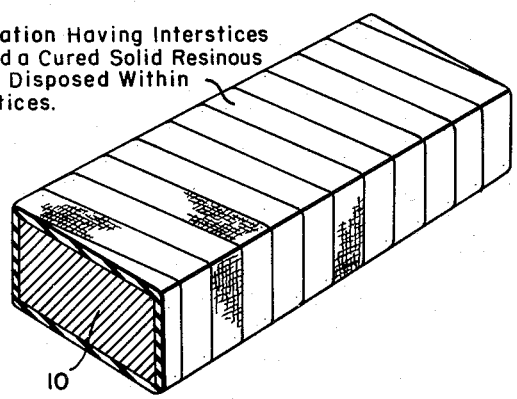
Solid Insulation Having Interstices Therein and a Cured Solid Resinous Copolymer Disposed Within the Interstices.
WITNESSES
INVENTORS
Dow A. Rodgers, Jr.
& Daniel W. Lewis
BY
ATTORNEY

2,849,527
Patented Aug. 26, 1958

2,849,527

POLYMERIC COMPOSITION CONTAINING SILICONE MODIFIED UNSATURATED POLYESTER AND VINYLIDENE MONOMER AND ELECTRICAL CONDUCTOR COATED THEREWITH

Dow A. Rogers, Jr., and Daniel W. Lewis, Pittsburgh, Pa., assignors to Westinghouse Electric Corporation, East Pittsburgh, Pa., a corporation of Pennsylvania Application May 20, 1955, Serial No. 510,037

6 Claims. (Cl. 174—121)

The present invention relates to resinous compositions and has particular reference to completely reactive polymerizable resinous compositions containing silicone modified polyester copolymers.

In the building of electrical apparatus, particularly high voltage generators and the like, it is desirable that the insulating material used have high thermal stability characteristics. Thus, for certain applications, the insulating material should be capable of withstanding temperatures in excess of 200° C. for prolonged periods of time without undergoing substantial decomposition at such temperatures.

In the past, numerous resinous insulating compositions have been suggested for application to electrical apparatus which operate at the higher temperatures. Many such insulating compositions have not proven to be completely satisfactory when the apparatus is operated at temperatures of 225° C. to 250° C. for long periods of time. Further, there are few resinous compositions which comprise completely reactive fluids which will cure entirely into a solid insulation which will withstand heating above 200° C. for long periods of time without decomposing or deteriorating severely.

The object of the present invention is to provide completely reactive synthetic copolymer resinous compositions containing unsaturated polyesters prepared from hydroxylated organosilicon monomers having a phenylene group bonded directly to two silicon atoms, which compositions after curing have exceptionally high thermal stability characteristics.

Another object of the present invention is to provide electrical apparatus insulated with a cured resinous composition embodying unsaturated polyesters prepared from hydroxylated organosilicon monomers having a phenylene group bonded directly to two silicon atoms, which compositions when applied to electrical apparatus provide insulation having outstanding physical and electrical properties even when the apparatus is operated at temperatures of 200° C. and higher for long periods of time.

For a more complete understanding of the present invention reference is made to the following detailed description, taken in conjunction with the accompanying drawing, the single figure of which is an isometric view of a conductor insulated with the resinous copolymer of this invention.

In the attainment of the foregoing objects and in accordance with the present invention, there is provided (A) from 5% to 95% by weight of a resinous polyester obtained by esterifying (a) an organosilicon monomer having the formula

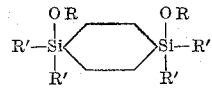

wherein R is a monovalent radical selected from the group consisting of hydrogen and —$(CH_2)_n OH$ radicals wherein $n$ is at least 2 and R' is a hydrocarbon selected from the group consisting of monovalent alkyl groups having not over four carbon atoms per molecule and monovalent aryl groups from the group consisting of a phenyl and benzene group with not over two methyl groups substituted for hydrogen atoms in the benzene ring, there being not more than one benzene ring for each molecule of organosilicon monomer, with (b) a substantially molar equivalent of at least one ethylenically unsaturated alpha, beta dicarboxylic acid, and (B) from 95% to 5% by weight of at least one liquid reactive unsaturated vinylidene monomer having the group >C=C<.

The compositions of this invention have exceptionally high physical and electrical properties when applied to electrical apparatus and cured to a resinous solid. The insulation does not decompose even when the apparatus is operated at temperatures of 200° C. and higher even for long periods of time.

An organosilicon monomer having a phenylene group bonded to two silicon atoms which has been found to be particularly useful in preparing the polyester portion of the resinous composition of this invention is 1,4 bis-(hydroxydimethylsilyl)benzene. This material is an organosilicon monomer, as indicated above, wherein R is hydrogen and may be prepared according to the following:

Example A

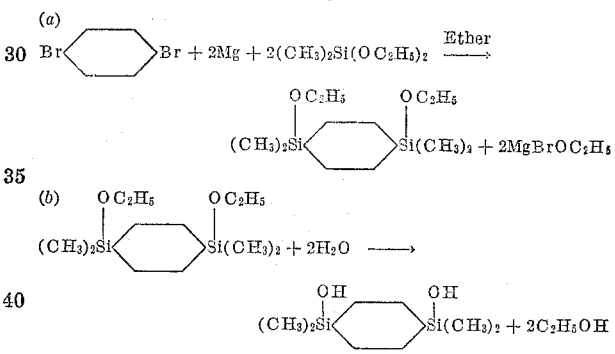

The reaction indicated in Equation $a$ is carried out by warming about 50 cc. of an ethyl ether solution containing about 25 grams of p-dibromobenzene and 292 grams of magnesium in a suitable vessel. A solution containing 1,155 grams of p-dibromobenzene and 1,480 grams of diethoxydimethylsilane dissolved in 975 cc. of ethyl ether then is added to the ether solution in the vessel at a rate such as to maintain gentle reflux. Precipitated salts are filtered out and the filtrate is distilled to yield about 565 grams of crude 1,4 bis-(ethoxydimethylsilyl)benzene which, on redistillation, gives a product having a boiling point of about 123–125° C. at a pressure of 3.5 millimeters of mercury; a density of about $D^{25}$ 0.9411; and an index of refraction of about $n_D^{25}$ 1.4748.

The 1,4 bis-(ethoxydimethylsilyl)benzene product obtained as indicated in Equation $a$ then may be hydrolyzed, as indicated in Equation $b$, to 1.4 bis-(hydroxydimethylsilyl)benzene by dissolving the benzene product of Equation $a$ in a volatile organic solvent and then agitating the resultant solution in the presence of a hydrolytic agent such as water or aqueous solutions of sulfuric acid, hydrochloric acid or organic acids such as picric acid.

Example B

The reaction of Equation $a$ may be carried out by replacing the two mols of diethoxydimethylsilane with two mols of diethoxydiethylsilane thereby producing 1,4 bis-(ethoxydiethylsilyl)benzene. This latter product, upon hydrolysis in the manner indicated in Equation $b$, yields 1,4-bis-(hydroxydiethylsilyl)benzene.

Example C

The reaction of Equation a also may be carried out by replacing the two mols of diethoxyphenylmethylsilane, with one mol of diethoxyphenylmethylsilane, thereby producing 1-dimethylethoxy-4-phenylmethylethoxylsilylbenzene. This latter product, upon hydrolysis in the manner indicated in Equation b, yields 1-dimethylhydroxy-4-phenylmethylhydroxysilyl benzene.

Example D

Instead of hydrolyzing the 1,4-bis-(ethoxydimethylsilyl)benzene product obtained as indicated in Equation b, that product may be reacted with a polyhydric alcohol such as ethylene glycol or propylene glycol to form an organosilicon monomer wherein R is an hydroxyalkyl radical, according to the following:

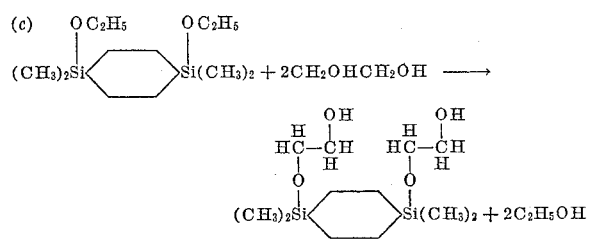

R' in the above formulae is a hydrocarbon selected from the group consisting of monovalent alkyl groups having not over four carbon atoms per molecule such as methyl groups, ethyl groups, propyl groups and isopropyl groups, and monovalent aryl groups from the group consisting of a phenyl and benzene group with not over two methyl groups substituted for hydrogen atoms on the benzene ring such as phenyl, tolyl and xylyl groups, there being not more than one benzene ring for each molecule of organosilicon monomer.

The ethylenically unsaturated alpha, beta dicarboxylic acids or anhydrides thereof, if any, which may be used in preparing the polyester resin portion of the compositions of this invention include maleic acid, fumaric acid, itaconic acid, citraconic acid, mesaconic acid, maleic anhydride and citraconic anhydride. These acids may be used singly or in any desired admixture of two or more.

In preparing the polyester resin, the unsaturated dicarboxylic acid may be replaced with up to about 95% of its weight with one or more saturated dicarboxylic acids or anhydrides thereof, if any. Examples of suitable acids include succinic acid, adipic acid, succinic anhydride, pimelic acid, suberic acid, azelaic acid and sebacic acid.

The polyester resins are prepared by reacting substantially equal molar amounts of the acidic component with the hydroxylated organosilicon monomer in accordance with usual esterification procedures. For example, the acidic components and the hydroxylated organosilicon monomer may be heated under reflux in the presence of an esterification catalyst such as hydrochloric acid, sulfuric acid, benzene sulfuric acid or the like. Removal of water formed in the reaction to increase the degree of esterification advantageously may be effected by utilizing azeotropic distillation techniques as, for example, by carrying out the reaction in the presence of a volatile organic liquid such as toluene, xylene or the like.

From 5% to 95% by weight of the (A) resinous polyester thus prepared then is dissolved in from 95% to 5% by weight of a (B) liquid reactive unsaturated vinylidene monomer having the group $>C=C<$, to yield a fluid resinous composition which will polymerize completely upon heating in the presence of one or more addition type polymerization catalysts. Examples of such catalysts are benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts in an amount of from 0.1% to 2% by weight, though somewhat larger or smaller amounts may be employed if desired. Polymerization accelerators such as cobalt naphthenate and azomethine also may be employed. Polymerization also may be effected through the utilization of radiation such as gamma rays, electron beams and actinic light.

In general, the compositions should contain from 5% to 95% by weight of the resinous polyesters and from 95% to 5% by weight of the liquid monomer, the preferred proportion being about 15% by weight of the resinous polyesters and about 85% by weight of the liquid monomer. When the polymerizable resinous compositions contain the various ingredients in the proportions indicated above the compositions exhibit the improved physical and electrical properties described hereinbefore.

Examples of liquid reactive unsaturated vinylidene monomers having the group $>C=C<$ which are suitable for use in accordance with this invention include monostyrene, vinyl toluene, alphamethylstyrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene, and divinyl benzene, as well as mixtures of two or more of any of these monomers.

The polymerizable compositions obtainable in accordance with the present invention usually cannot be stored conveniently in mixed form since polymerization generally will take place even at room temperatures within a comparatively short period of time. To overcome or substantially minimize this difficulty it is preferred to incorporate a relatively small proportion of one or more polymerization inhibitors in the mixture of resinous polyesters and reactive unsaturated monomer. Polymerization inhibitors which are suitable for use in accordance with this invention include substituted phenols and aromatic amines. More specific examples of suitable polymerization inhibitors include hydroquinone, resorcinol, tannin, sym. alpha, beta naphthyl p-phenylene diamine, and the like. The inhibitor preferably is employed in relatively small proportions. Thus, amounts less than about 1.0% should be used, with amounts as small as about 0.01% to about 0.1% generally being sufficient.

In order to indicate even more fully the advantages and capabilities of the compositions of the present invention, the following specific examples are set forth. The parts given are by weight unless otherwise indicated.

Example I

Into a reaction vessel there are introduced 1.0 mol (98 parts) of maleic anhydride and 17.4 parts of xylene. A 1 liter per minute flow of nitrogen gas is bubbled through the mixture in the flask to enable sparging thereof. The mixture then was heated to 70° C. whereupon 1.1 mols (249 parts) of 1,4 bis-(hydroxydimethylsilyl) benzene were added thereto. The temperature of the resultant mixture then was raised to 145° C. and held there for 4 hours. Thereafter, heating was continued at 200° C. for an additional 11 hours, at the end of which time the esterification reaction mass had become extremely viscous. The esterified product thus obtained then was cooled to 150° C., whereupon 0.01% of hydroquinone as a 5% solution in dibutyl phthalate was added. The product thus obtained was a viscous resinous polyester which was dissolved in monostyrene in the proportion of 75 parts polyester resin: 25 parts monostyrene. The resultant mixture was a fluid resinous composition which when admixed with 1% benzoyl peroxide and subjected to heat or actinic light or both yielded a solid cured resinous copolymer having excellent physical and electrical properties.

Example II

The process of Example I is repeated with the exception that 0.5 mol of maleic anhydride and 0.5 mol of adipic acid are used in place of 1.0 mol of maleic anhydride. The resultant esterification product upon dissolution in monostyrene and heating in the presence of 1% benzoyl peroxide produces a solid cured resinous copolymer having properties similar to those of the composition described in Example I.

Example III

Into a reaction vessel there were charged 1.0 mol (110 parts) of 1,4 bis-(ethoxydimethylsilyl) benzene and 2.0 mols (48.4 parts) of ethylene glycol. A 1 liter per minute flow of carbon dioxide was bubbled through the mixture contained in the vessel to enable sparging thereof. Heat and agitation were applied and the temperature allowed to rise to 110° C. The mixture was held at this temperature for 2¼ hours to permit ester interchange to go to substantial completion. Thereafter, 1.0 mol (38.3 parts) of maleic anhydride was added to the mixture and the temperature increased to 150–160° C. and held there for 2 hours. The temperature then was raised to 225° C. and held there for an additional 13 hours, at the end of which time the esterification had gone to substantial completion to yield a viscous polyester. The reaction mass then was allowed to cool to 150° C. and 0.01% hydroquinone as a 5% solution in dibutyl phthalate was added. The resultant liquid polyester resin was blended with monostyrene in the proportion of 75 parts resin to 25 parts monostyrene. On heating in the presence of 1% by weight benzoyl peroxide the liquid resin cured to a solid copolymer having high physical and electrical thermal stability characteristics.

One-eighth inch thick castings were made using the silicon modified polyester copolymers described in the foregoing examples, which copolymers were catalyzed with 1% tertiary butyl perbenzoate and cured at 80° C. The castings were baked in an oven maintained at a temperature of 135° C. for 16 hours. The castings were light amber in color when originally prepared and were observed to darken only slightly after 5 days' aging at 250° C. At the end of the aging period the castings were still transparent and had neither shrunk nor cracked.

Referring to the drawing, there is illustrated a conductor 10 having solid insulation disposed thereon. The solid insulation has interstices therein and a cured solid resinous copolymer of this invention is disposed within the interstices.

The compositions of this invention have excellent thermal stability and satisfactory stress-strain properties. As such, they are eminently suitable for use as insulation on pieces of electrical apparatus of various kinds. They may, for example, be used as an impregnating insulation being applied to transformers or the like by impregnating procedures well known to the electrical industry. Such resins also may be employed to encapsulate various kinds of electrical apparatus, for example, transformers. When put to such use, the resins advantageously are admixed with mica or other finely divided inorganic flake-like material to increase their thixotropic properties. The compositions of this invention also may be used for encapsulating electrical apparatus according to the process disclosed in U. S. Patent No. 2,795,009.

The compositions of this invention also may be utilized in the preparation of laminated bodies, such bodies comprising a plurality of layers of fibrous material bonded to one another by the thermoset resinous material of this invention. Radomes on aircraft may be manufactured utilizing the present compositions by, for example, impregnating sheets of glass cloth with the fluid compositions, superimposing the impregnated sheets upon one another and then pressing the assemblage into the desired shape under heat in the presence of a suitable addition-type polymerization catalyst.

The exceptionally high thermal stability and excellent mechanical stress-strain characteristics of the compositions of this invention make them particularly well suited for use in the production of molded articles of all kinds. Molded fan blades for use in motors which operate at high temperatures may efficaciously be prepared from these present compositions. The compositions also are useful in the molding of iron handles, kitchenware and like articles. Such molded or cast articles may be formed by pouring or otherwise introducing the compositions of this invention into a mold of suitable design and curing to shape.

The compositions of this invention may be admixed with up to twice their weight of various solid fillers such as 300 mesh silica, chopped glass fibers, asbestos fibers, wollastonite, powdered glass, iron oxide, titanium dioxide, finely divided clays such as bentonite, kaolin and catalpa clay, aluminum oxide, inorganic silicates, and graphite. For certain resistance applications, finely divided metal powders such as 300 mesh copper, 250 mesh aluminum flakes or granules and silver powder may be admixed in an amount of up to 70% of the weight of the total, the resinous composition comprising at least 30% by weight.

While the present invention has been described with reference to particular embodiments and examples, it will be understood, of course, that modifications, substitutions and the like may be made therein without departing from its true scope.

We claim as our invention:

1. A polymerizable resinous composition comprising (A) from 5% to 95% by weight of a resinous polyester obtained by esterifying (a) an organosilicon monomer having the formula

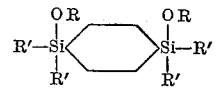

wherein R is a monovalent radical selected from the group consisting of hydrogen and —$(CH_2)_n OH$ radicals wherein $n$ is at least 2 and R' is a hydrocarbon selected from the group consisting of monovalent alkyl groups having not over four carbon atoms per molecule and monovalent aryl groups from the group consisting of a phenyl and benzene group with not over two methyl groups substituted for hydrogen atoms in the benzene ring, there being not more than one benzene ring for each molecule of organosilicon monomer, with (b) a substantially molar equivalent of at least one ethylenically unsaturated alpha, beta dicarboxylic acid, (B) from 95% to 5% by weight of at least one liquid unsaturated vinylidene monomer having the reactive group >C=<, and (C) at least one polymerization inhibitor.

2. A polymerizable resinous composition as set forth in claim 1 wherein the organosilicon monomer (a) is

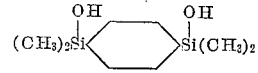

3. A polymerizable resinous composition as set forth in claim 1 wherein the organosilicon monomer (a) is $$\begin{array}{cc} H \ OH & H \ OH \\ | \ | & | \ | \\ HC-CH & HC-CH \\ | \ | & | \ | \\ O \ H & O \ H \\ | & | \\ (CH_3)_2Si\!\!\!&\!\!\!Si(CH_3)_2 \end{array}$$

4. A polymerizable resinous composition as set forth in claim 1 wherein up to 95% by weight of the unsaturated acid is replaced with at least one saturated dicarboxylic acid having from 2 to 10 carbon atoms per molecule.

5. A solid resinous copolymer comprising (A) from 5% to 95% by weight of a resinous polyester obtained by esterifying (a) an organosilicon monomer having the formula

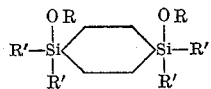

wherein R is a monovalent radical selected from the group consisting of hydrogen and —$(CH_2)_nOH$ radicals wherein $n$ is at least 2 and R' is a hydrocarbon selected from the group consisting of monovalent alkyl groups having not over four carbon atoms per molecule and monovalent aryl groups from the group consisting of a phenyl and benzene group with not over two methyl groups substituted for hydrogen atoms in the benzene ring, there being not more than one benzene ring for each molecule of organosilicon monomer, with (b) a substantially molar equivalent of at least one ethylenically unsaturated alpha, beta dicarboxylic acid, and (B) from 95% to 5% by weight of at least one liquid unsaturated vinylidene monomer having the reactive group >C=C<, said solid resinous copolymer having been prepared by admixing (A) and (B) and heating the same in the presence of at least one polymerization catalyst.

6. An insulated conductor comprising an electrical conductor, solid insulation disposed upon the electrical conductor, the solid insulation having interstices therein, and a cured solid resinous copolymer disposed within the interstices of the solid insulation and completely filling the same, the cured solid resinous copolymer comprising (A) from 5% to 95% by weight of a resinous polyester obtained by esterifying (a) an organosilicon monomer having the formula

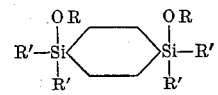

wherein R is a monovalent radical selected from the group consisting of hydrogen and —$(CH_2)_nOH$ radicals wherein $n$ is at least 2 and R' is a hydrocarbon selected from the group consisting of monovalent alkyl groups having not over four carbon atoms per molecule and monovalent aryl groups from the group consisting of a phenyl and benzene group with not over two methyl groups substituted for hydrogen atoms in the benzene ring, there being not more than one benzene ring for each molecule of organosilicon monomer, with (b) a substantially molar equivalent of at least one ethylenically unsaturated alpha, beta dicarboxylic acid, and (B) from 95% to 5% by weight of at least one liquid unsaturated vinylidene monomer having the reactive group >C=C<, said cured solid resinous copolymer having been prepared by admixing (A) and (B) and heating the same in the presence of a peroxide catalyst.

References Cited in the file of this patent

UNITED STATES PATENTS

| | | |
|---|---|---|
| 2,562,000 | Sveda | July 24, 1951 |
| 2,576,486 | Spier | Nov. 27, 1951 |
| 2,677,067 | Johnson et al. | Apr. 27, 1954 |